March 22, 1955  L. C. HEWITT ET AL  2,704,419
GLASS FURNACE
Filed June 29, 1950  3 Sheets-Sheet 1
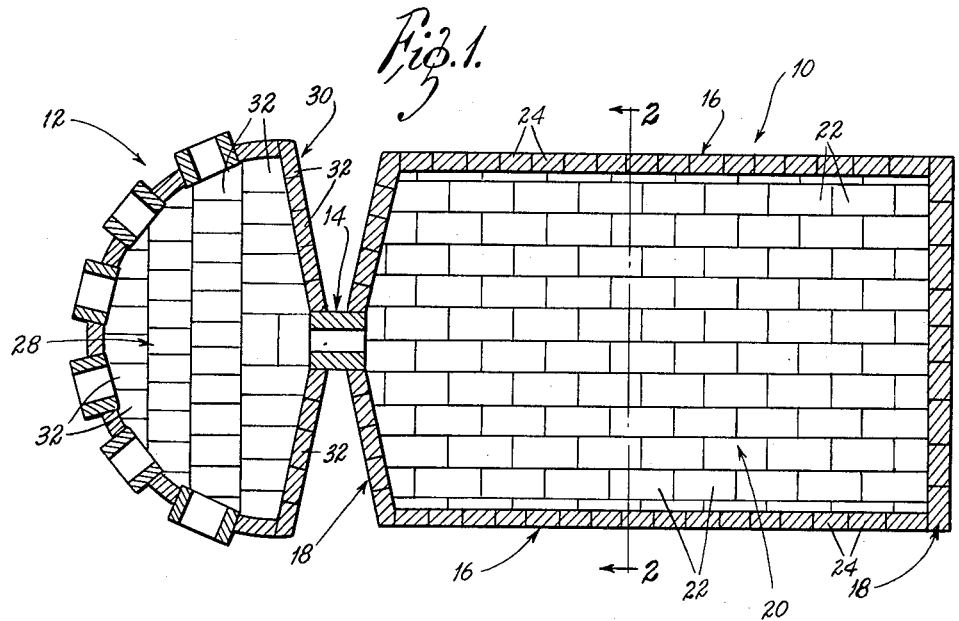
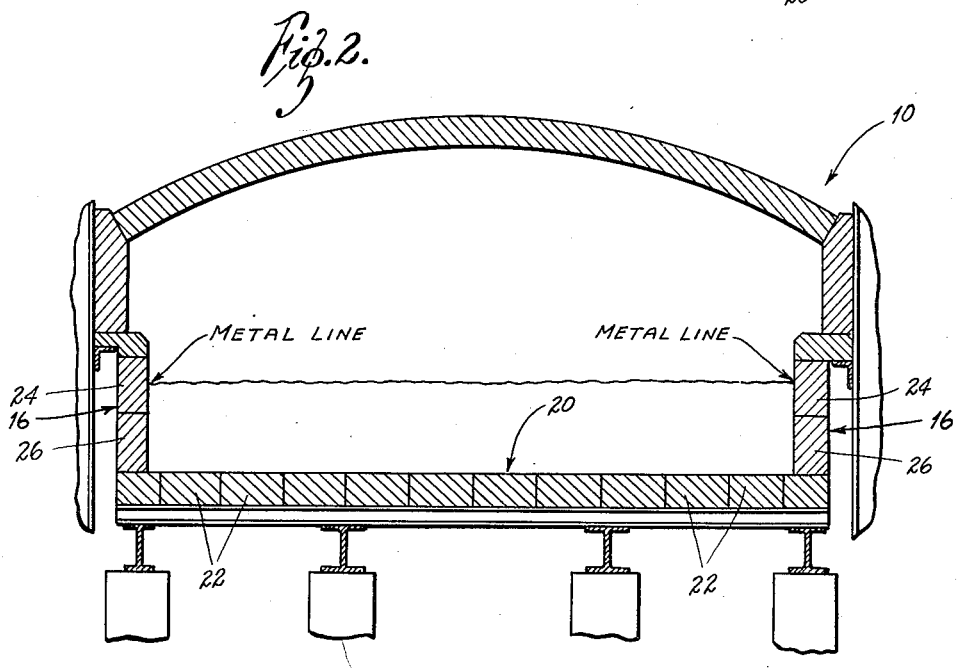
INVENTORS:
LOWELL C. HEWITT,
AUSTIN J. PAUL,
BY Kingsland, Rogers & Ezell
ATTORNEYS

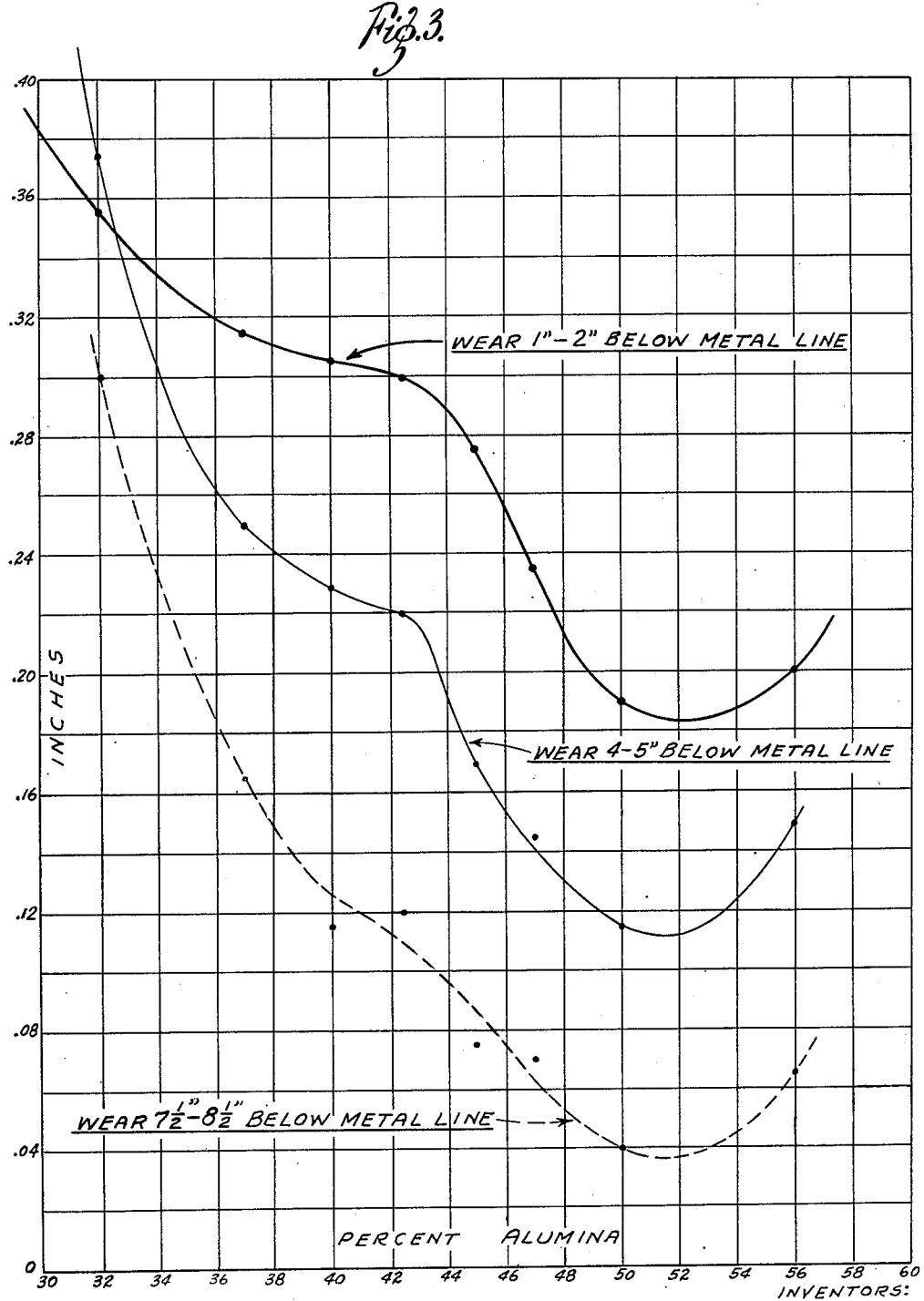

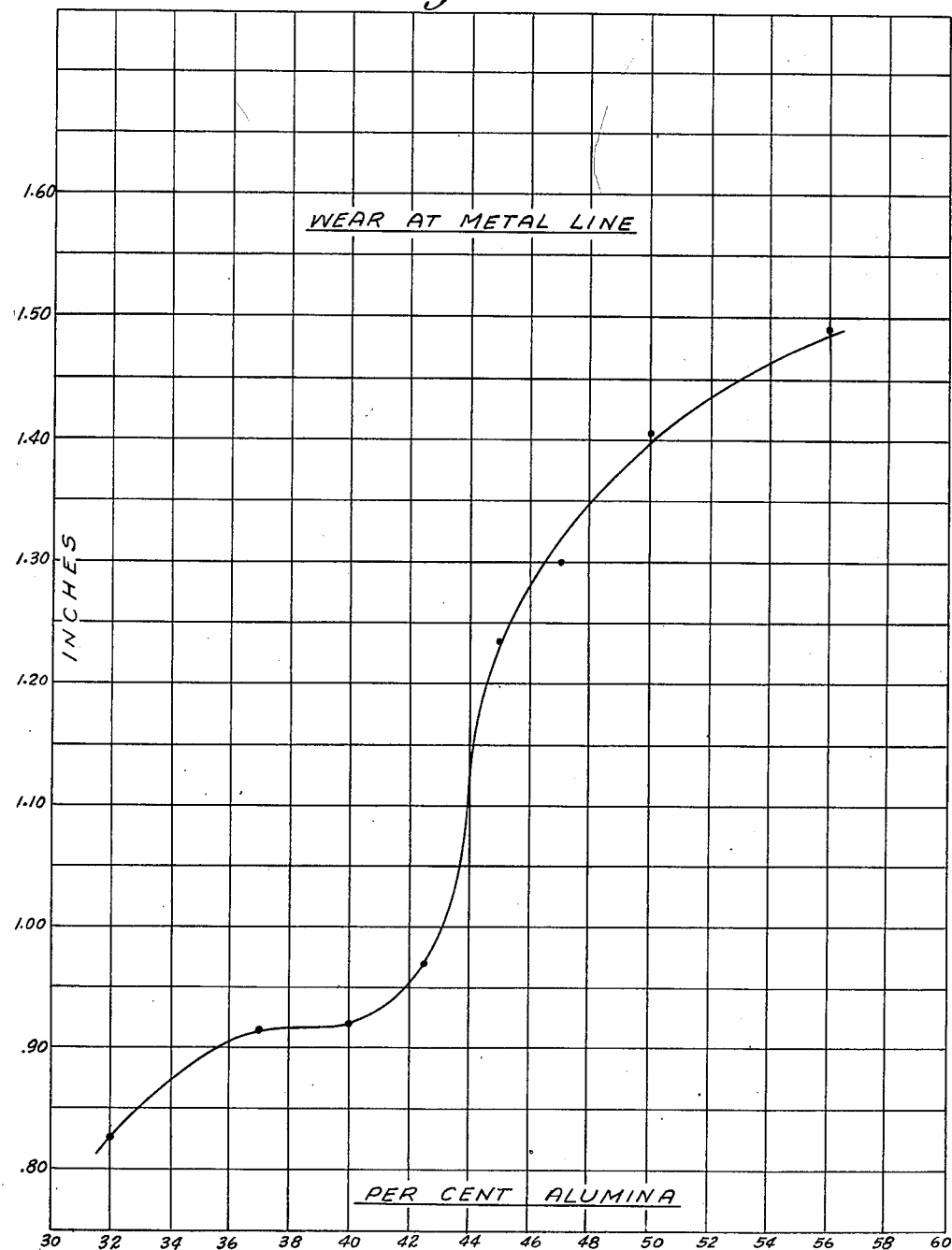

United States Patent Office 2,704,419
Patented Mar. 22, 1955

2,704,419
GLASS FURNACE

Lowell C. Hewitt, Clayton, and Austin J. Paul, Kirkwood, Mo., assignors to Laclede-Christy Company, St. Louis, Mo., a corporation of Missouri Application June 29, 1950, Serial No. 171,086

4 Claims. (Cl. 49—54)

The present invention relates generally to the refractory art, and more particularly to a novel glass furnace and to a novel type of fire clay tank block in the refining end and below the metal line in the melting end of such furnace.

In its preferred form, the furnace contains a series of tank blocks consisting essentially of alumina and silica, the blocks at the metal line in the melting end containing less than 42% alumina, and the blocks below the metal line in the melting end and throughout the refining end containing more than 37% alumina and preferably about 52% alumina.

At the present time, fire clay tank blocks for use in glass furnaces contain less than 36% alumina and it is known that, when using blocks containing up to 36% alumina, the wear at the metal line in the melting end of the furnace steadily increases with an increase in alumina content.

Furthermore, the glass furnaces in use at the present time employ fire clay tank blocks of the same alumina content in all parts of the furnaces, in both the melting end and in the refining end. Stating it differently, the same type of block is used at the metal line, below the metal line, and in the bottom of the furnace.

Thus, at the present time, the alumina content of fire clay tank blocks used in all parts of a glass furnace is determined by the wear of the blocks at the metal line, and because it is known that this wear steadily increases with an increase in alumina content up to 36%, the alumina content of all the blocks is maintained below 36%.

It is an object of the present invention, therefore, to provide a glass furnace in which the alumina content of the fire clay tank blocks in the melting end is varied, depending on their position relative to the metal line.

Another object is to provide a glass furnace in which the alumina content of the fire clay tank blocks at the metal line in the melting end is below 42%, and the alumina content of those below the metal line is above 37%.

Another object is to provide a novel fire clay tank block for use in the refining end and below the metal line in the melting end of glass furnaces, which has increased wearing characteristics over the siliceous tank blocks in use at the present time.

Another object is to provide a novel fire clay tank block for use in contact with molten glass except at the metal line in the melting end walls, which contains above 37% alumina.

Another object is to provide an aluminous fire clay tank block having a coefficient of thermal expansion which is less than that of the conventional siliceous tank blocks, so as to lessen the risk of cracking when the furnace is heated.

Another object is to provide an aluminous fire clay tank block which has a fired strength which is higher than that of the conventional siliceous block, so as to minimize breakage during shipment.

Further objects and advantages of the present invention will be apparent from the following description.

In the drawing:

Fig. 1 is a fragmentary top plan view of a typical glass furnace embodying the teachings of the present invention;

Fig. 2 is an enlarged fragmentary vertical transverse sectional view of the furnace taken on the line 2—2 in Fig. 1;

Fig. 3 is a graph indicating the wear on a series of tank blocks of various alumina content in a glass furnace, 1 to 2 inches below the metal line, 4 to 5 inches below the metal line, and 7½ to 8½ inches below the metal line; and Fig. 4 is a graph indicating the wear on a series of tank blocks of various alumina content in a glass furnace, at the metal line.

Fire clay tank blocks consisting essentially of alumina and silica and containing varying amounts of alumina, both above and below 36%, were placed in a glass tank furnace from time to time along with other types of blocks which were being tested in order to determine their wearing characteristics.

The test furnace used was of the circular rotating gas fired type with the flame coming through a stationary lid.

The results of these various tests are tabulated below. The glass used in test No. 19 was window glass, and in all the others it was bottle type glass.

TEST RUN NO. 17

| Block No. | Alumina | Silica | Wear in Inches | | |
|---|---|---|---|---|---|
| | | | At Metal Line | 1-2" Below | 6-7" Below |
| A | 44.10 | 51.88 | 2.90 | .45 | .10 |
| B | 35.28 | 60.93 | 2.40 | .70 | .17 |

TEST RUN NO. 19 (Window Glass)

| C | 44.69 | 51.17 | 2.72 | .75 | .20 |
| D | 35.69 | 60.38 | 2.37 | 1.12 | .75 |

TEST RUN NO. 22

| E | 41.37 | 53.79 | 3.54 | .64 | .25 |
| F | 30.68 | 65.10 | 2.44 | .67 | .28 |

TEST RUN NO. 36

| G | 43.52 | 51.40 | 3.16 | .86 | .38 |
| H | 33.83 | 62.17 | 2.62 | 1.09 | .55 |

In addition to the alumina and silica, the blocks also contained small amounts of iron oxide, titania, calcium oxide, magnesium oxide, sodium oxide, potassium oxide, etc.

In test runs Nos. 36 and 38, blocks were placed in the bottom of the test furnace, with the following average results:

TEST NO. 36

| Block | Alumina | Silica | Inches Wear |
|---|---|---|---|
| G | 43.52 | 51.40 | .50 |
| H | 33.83 | 62.17 | 1.50 |
| F | 30.68 | 65.10 | 1.50 |

TEST NO. 38

| J | 42.5 | 52.5 | .20 |
| K | 32.0 | 63.0 | .71 |

After it was conclusively established from the above tests that fire clay tank blocks containing more than 36% alumina had less wear below the metal line and in the bottom of the furnace than fire clay blocks containing less than 36% alumina, a test was run to determine the percentage of alumina at which the least wear resulted and in the percentage above which the rate of wear was greatly decreased.

The tank blocks for this test were made by the slip cast, de-aired process as described in the co-pending Cooke et al. application, Serial No. 51,898, filed September 30, 1948, now Patent No. 2,553,359 and consisted of a mixture of calcined and raw fire clays with the addition of aluminous materials and/or siliceous materials not to exceed 25% of the total. The alumina content of these blocks ranged between 32% and 56%.

The blocks were made in sets of two, each set having the same alumina content and each block in a set being placed in a different part of the furnace. The average wear of each set of blocks was determined at the metal line, and between 1 to 2 inches, 4 to 5 inches, and 7½ to 8½ inches below the metal line. The results of this test are tabulated below.

TEST RUN NO. 39

| Set No. | Alumina Content | Average Wear in Inches | | | |
|---|---|---|---|---|---|
| | | Metal Line | 1 to 2 Inches Below Metal Line | 4 to 5 Inches Below Metal Line | 7½ to 8½ Inches Below Metal Line |
| L | 32 | .825 | .355 | .375 | .30 |
| M | 37 | .915 | .315 | .25 | .165 |
| N | 40 | .92 | .305 | .23 | .115 |
| O | 42.5 | .97 | .30 | .22 | .12 |
| P | 45 | 1.235 | .275 | .17 | .075 |
| Q | 47 | 1.30 | .235 | .145 | .07 |
| R | 50 | 1.405 | .19 | .115 | .04 |
| S | 56 | 1.49 | .20 | .15 | .065 |

As indicated in Fig. 3, the wear at various points below the metal line decreases steadily with an increase in alumina content until the alumina content is in the neighborhood of 37%. At this point there is a change in the rate of wear with increase in alumina content, and the curves tend to level off. This leveling off, which is most apparent in the two upper curves, continues until about 42%. At about 42% there is a very pronounced decrease in the rate of wear with increase in alumina content and thereafter the rate of wear steadily decreases until in the neighborhood of about 52% alumina. After 52% alumina, any further increase in the alumina content of the block results in an increase in wear, at least up to 56%.

Thus, it has been determined, that for tank blocks used below the metal line in the melting end of glass furnaces, the alumina content should be above about 37% and preferably about 52%.

As indicated in Fig. 4, the rate of wear at the metal line steadily increases with increase in alumina content until about 37%. At this point the curve first levels off and then the rate of wear increases gradually until about 42%. Thereafter, the rate of wear increases very rapidly with increase in alumina content. From this it has been determined that for fire clay tank blocks for use at the metal line in the melting end of glass furnaces the alumina content should be maintained below about 42%.

The best glass furnace, therefore, from the standpoint of minimum wear, is one in which fire clay tank blocks containing more than 37% alumina and preferably about 52% alumina are used throughout in the refining end and below the metal line and in the bottom in the melting end; and blocks containing less than 42% alumina are used at the metal line in the melting end.

As shown in Figs. 1 and 2, a typical glass furnace contains a melting end 10 and a refining end 12 which are connected together by a trough-like portion 14.

The melting end 10 is roughly rectangular in shape and includes side walls 16, end walls 18 and a bottom 20.

The bottom 20 comprises a single layer of horizontally disposed, abutting, fire clay blocks 22 which contain more than 37% alumina and preferably about 52% alumina.

The side and end walls 16 and 18, respectively, comprise a single layer of vertically disposed, abutting, fire clay blocks and are at least two blocks high, there being one series of blocks 24 at the metal line and at least one other series of blocks 26 below the blocks 24. The blocks 24, which are at the metal line, contain less than 42% alumina, and the blocks 26 contain more than 37% alumina and preferably about 52% alumina.

The refining end 12, which is roughly semi-circular in shape, includes a bottom 28 and side walls 30, both of which are formed of a single layer of fire clay blocks 32.

The blocks 32 in the side walls 30 at the metal line and below the metal line, and the blocks 32 in the bottom 28 contain more than 37% alumina and preferably about 52% alumina.

It is to be understood that the foregoing description has been given only by way of illustration and example and that changes and alterations in the present disclosure, which will be readily apparent to one skilled in the art, are contemplated as within the scope of the present invention which is limited only by the claims which follow.

What is claimed is:

1. A glass furnace comprising, in combination, walls and a bottom, said walls and bottom being of fireclay compositions containing essentially alumina and silica, said walls at the metal line including less than about 38% alumina, and the lower wall portions and bottom including between about 38% to 56% alumina.

2. A glass furnace comprising, in combination, walls and a bottom, said walls and bottom being of fireclay blocks containing essentially alumina and silica, said blocks at the metal line including less than about 38% alumina, and said blocks forming the lower wall portions and bottom including between about 38% to 56% alumina.

3. A glass furnace comprising, in combination, walls and a bottom, said walls and bottom being of fireclay compositions containing essentially alumina and silica, said walls at the metal line including about 32% alumina, and the lower wall portions and bottom including about 43% alumina.

4. A glass furnace comprising, in combination, walls and a bottom, said walls and bottom being of fireclay blocks containing essentially alumina and silica, said blocks at the metal line including about 32% alumina, and said blocks forming the lower wall portions and bottom including about 43% alumina.

References Cited in the file of this patent

UNITED STATES PATENTS

| | | |
|---|---|---|
| 784,621 | Klein | Mar. 14, 1905 |
| 1,741,920 | Curtis | Dec. 31, 1929 |
| 1,786,482 | Curtis | Dec. 30, 1930 |
| 1,893,313 | Willetts | Jan. 3, 1933 |
| 2,044,817 | Schroeder | June 23, 1936 |
| 2,195,950 | Wood | Apr. 2, 1940 |
| 2,196,075 | Logan et al. | Apr. 2, 1940 |
| 2,263,848 | Keaney | Nov. 25, 1941 |
| 2,272,346 | McDougal et al. | Feb. 10, 1942 |
| 2,425,151 | Greger | Aug. 5, 1947 |
| 2,467,889 | Harter et al. | Apr. 19, 1949 |

FOREIGN PATENTS

| | | |
|---|---|---|
| 316,129 | Great Britain | 1930 |
| 329,328 | France | 1903 |